(12) United States Patent
Harchol-Balter et al.

(10) Patent No.: US 8,589,709 B2
(45) Date of Patent: Nov. 19, 2013

(54) SYSTEMS AND METHODS FOR MANAGING POWER CONSUMPTION AND PERFORMANCE OF A PROCESSOR

(75) Inventors: Mor Harchol-Balter, Pittsburgh, PA (US); Anshul Gandhi, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 216 days.

(21) Appl. No.: 12/841,636

(22) Filed: Jul. 22, 2010

(65) Prior Publication Data

US 2011/0022868 A1    Jan. 27, 2011

Related U.S. Application Data

(60) Provisional application No. 61/271,621, filed on Jul. 23, 2009.

(51) Int. Cl.
G06F 1/32    (2006.01)

(52) U.S. Cl.
USPC .......................................... 713/323; 713/320

(58) Field of Classification Search
USPC .................. 713/300, 320, 322–324, 500–502
See application file for complete search history.

(56) References Cited

U.S. PATENT DOCUMENTS

| 7,272,517 | B1* | 9/2007 | Brey et al. .................. 702/60 |
| 7,418,608 | B2* | 8/2008 | Kumar et al. ................. 713/320 |
| 7,421,597 | B2* | 9/2008 | Kardach et al. .............. 713/300 |
| 8,108,703 | B2* | 1/2012 | Bahali et al. ................. 713/320 |
| 8,135,970 | B2* | 3/2012 | Gaskins et al. .............. 713/322 |
| 2002/0007463 | A1* | 1/2002 | Fung ............................ 713/320 |
| 2003/0188210 | A1* | 10/2003 | Nakazato ..................... 713/320 |
| 2008/0104430 | A1* | 5/2008 | Malone et al. ............... 713/300 |
| 2010/0023790 | A1* | 1/2010 | Cooper et al. ............... 713/322 |
| 2010/0115084 | A1* | 5/2010 | Caspi et al. .................. 709/224 |

* cited by examiner

Primary Examiner — Glenn A Auve
(74) Attorney, Agent, or Firm — Downs Rachlin Martin PLLC (57) ABSTRACT

Processor-management techniques that purposely alternate a processor between an operating state and a non-operating state while the processor is executing the workload. The techniques leverage the "ultra-low-power" non-operating states of many processors to provide predictable power and/or frequency control of the processor. These techniques can provide better performance than known clock-throttling and dynamic voltage and frequency scaling schemes for controlling processors.

33 Claims, 8 Drawing Sheets

SYSTEMS AND METHODS FOR MANAGING POWER CONSUMPTION AND PERFORMANCE OF A PROCESSOR

RELATED APPLICATION DATA

This application claims the benefit of priority of U.S. Provisional Patent Application Ser. No. 61/271,621, filed Jul. 23, 2009, and titled "Efficient Power Management For Computing Devices By Alternating Between Extreme Power States," which is incorporated by reference herein in its entirety.

STATEMENT REGARDING FEDERALLY SPONSORED RESEARCH AND DEVELOPMENT

This invention was made in part with government support under Grant Number CNS-0615262. The United States Government may have certain rights in this invention.

FIELD OF THE INVENTION

The present invention generally relates to the field of managing power and performance of computing devices. In particular, the present invention is directed to systems and methods for managing power consumption and performance of a processor.

BACKGROUND

For some time now, the amount of power consumed by servers has been increasing, as has the number of servers placed in various facilities. Servers today consume ten times more power than they did ten years ago. The U.S. Environmental Protection Agency estimated that in 2006 the nation's servers and data centers collectively consumed approximately 61 billion kilowatt-hours, or 1.5% of total U.S. electricity consumption, at a total cost of approximately $4.5 billion. This level represents a doubling in the level of energy consumption by data centers in the five years since 2001; and the level is expected to double again by 2011 as more and more applications shift from the desktop to a server-based computing paradigm. Already there are large server farms comprising a million or more servers.

The problem has grown to the extent that in California, for example, where twenty percent of the world's servers are currently located, data centers are drawing enormous power from the grids while parts of the state sometime endure blackouts. According to one expert specializing in the study of storage systems, these large clusters of power-hungry machines, along with rising energy prices, are generating huge energy bills, forcing data center owners nationwide to seek more energy-efficient solutions. An even bigger problem arises when the amount of available power in a facility is insufficient for companies to grow the number of servers required to meet demand. This server power management problem will increasingly impact companies' ability to scale their businesses, satisfy their customers, and optimize their operational efficiencies.

Driving the overall growth in server farms is the increased capacity required to run Internet-based businesses. In addition to the growth in traditional Web-based service providers, a revolution is currently taking place in the $120 billion software industry that will further drive the demand for server resources. Software applications that traditionally have been installed on personal computers are going online.

In addition to managing the power consumption of servers, power management is also important for battery-powered devices, such as laptops, smartphones, tablet computers, netbooks, etc., that have a limited amount of power available between chargings or battery replacement. While battery technology continues to improve, mobile devices are currently limited to less than 10 hours of use, and more typically, less than four hours of use, between chargings. Because charging mobile devices can be inconvenient, users want their devices to last longer between chargings.

SUMMARY OF THE DISCLOSURE

In one implementation, the present disclosure is directed to a method of controlling power consumption of a computing system that includes a processor having an operating state in which the processor is powered to execute workload instructions and a non-operating state in which the processor is not powered to execute the workload instructions. The method includes: receiving a workload-power-state setting for controlling functioning of the processor; and controlling the processor as a function of the workload-power-state setting, wherein the controlling includes alternating the processor between the operating state and the non-operating state during execution of a workload by the processor.

In another implementation, the present disclosure is directed to a machine-readable medium containing non-transitory machine-executable instructions for performing a method of controlling power consumption of a computing system that includes a processor having an operating state in which the processor is powered to execute workload instructions and a non-operating state in which the processor is not powered to execute the workload instructions. The non-transitory machine-executable instructions include: a first set of machine-executable instructions for receiving a workload-power-state setting for controlling functioning of the processor; and a second set of machine-executable instructions for controlling the processor as a function of the workload-power-state setting, wherein the second set of machine-executable instructions includes a third set of machine-executable instructions for alternating the processor between the operating state and the non-operating state during execution of a workload by the processor.

In still another implementation, the present disclosure is directed to a computing system that includes: a processor having an operating state in which the processor is powerable to execute workload instructions and a non-operating state in which the processor is not powered to execute the workload instructions; a memory; and a workload-power-state manager stored in the memory and operatively configured to, when the computing system is operating: receive a workload-power-state setting for controlling functioning of the processor; and control the processor as a function of the workload-power-state setting, wherein the control includes alternating the processor between the operating state and the non-operating state during execution of a workload by the processor.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

This present invention includes techniques for maintaining a fixed power budget for a computing device, or processor, while minimizing mean response time of the processor. Thus, these techniques can be useful, for example, for managing power consumption of servers in a server farm. Similar techniques can be used to minimize the power consumption of a processor. Such techniques can be particularly useful in mobile devices, such as laptops, netbooks, smartphones, tablet computers, etc., where power management is important for, among other things, maximizing the time between charging. In conjunction with minimizing power consumption, techniques disclosed herein can be used to ensure that a certain minimum average processor frequency is maintained. This can be useful, for example, in a mobile device running an application, such as a video playback application, wherein a certain minimum processor frequency is needed to provide acceptable performance, for example, flicker-free video playback. These and other uses of techniques of the present invention will become apparent to those skilled in the art after reading this entire disclosure.

As described below in detail, the foregoing and other goals are accomplished in accordance with the present invention by quickly and purposely alternating a processor between an operating state and an "ultra-low-power" non-operating state while the processor is processing a workload. In some implementations the present invention includes utilizing workload power state (WPS) algorithms that leverage one of the ultra-low-power non-operating states that are available in today's processors. These ultra-low-power non-operating states are conventionally used when the processor is idle, i.e., when the processor is not executing workload instructions, to maintain low average power usage while minimizing mean response time. These WPS algorithms differ significantly from some other schemes that use low-power non-operating states, since those schemes only switch to a non-operating state when there are no workload instructions to execute. In contrast, the WPS algorithms of the present invention purposely alternate between an operating state and a non-operating state, even when the processor is operating at full capacity.

By repeatedly alternating a processor between an operating state, such as the highest performance state, and an ultra-low-power non-operating state, a WPS algorithm of the present invention can be used to achieve a fixed average power budget. This approach significantly increases the average processor frequency for a given power budget. The WPS algorithms disclosed herein can be implemented in novel power-capping techniques that achieve higher effective processor frequency for a given power constraint than known existing techniques. One of these WPS techniques works by repeatedly alternating between the highest performance state and an ultra-low-power non-operating state to maintain a fixed average power budget, while significantly increasing the average processor frequency. The WPS techniques disclosed herein differ from existing power capping techniques, which alternate the processor between adjacent (nearby in terms of clock frequency) operating states, rather than between operating and non-operating states as occurs in a WPS scheme of the present disclosure. The disclosed WPS algorithms can achieve results superior to conventional power-capping schemes not only in a clock-throttling (a.k.a., dynamic frequency scaling) context, but also in a dynamic voltage and frequency scaling (DVFS) context, as long as they can access and utilize the appropriate one(s) of the non-operating states of the processor.

Before proceeding with describing exemplary embodiments, it is useful to define terminology used in this description and in the appended claims. A "computing system" refers to a combination of hardware (processor, memory, devices, etc.) and software (operating system, programs, drivers, etc.) designated for running on that hardware and/or controlling or otherwise interacting with that hardware. A "workload" denotes one or more tasks defined by an application or other software running on a particular computing system. A workload consists essentially of workload instructions that are executed by the processor and any data accompanying the workload instructions. An "operating state" of a processor is a state in which the clock(s) of the processor is/are working at a frequency such that the processor is capable of executing workload instructions. The "minimum operating state" is the state of the processor below which the processor can no longer execute workload instructions. The "maximum normal operating frequency state" is the state at which the processor clock(s) is/are neither under-clocked nor over-clocked, as these terms are known in the art. An operating state can also be an under-clocked or over-clocked operating state. Examples of under-clocking schemes include clock-throttling schemes. An example of an operating state is the "C0" state under the well-known "C-state" convention (see below).

In contrast, a "non-operating state" is essentially any processor state in which the processor is not capable of executing workload instructions. The Table below provides some examples of non-operating states under a contemporary C-state convention. As seen in this Table, non-operating states are typically characterized by the stopping of at least some of the internal clocks of the central processing unit (CPU).

TABLE

| State | Name | Functionality |
|---|---|---|
| C1 | Halt | Stops internal CPU main clocks via software; bus interface and advanced programmable interrupt controller (APIC) kept running at full speed |
| C1E | Enhanced Halt | Stops CPU main internal clocks via software and reduces CPU voltage; bus interface and APIC kept running at full speed |
| C2 | Stop Grant/Stop Clock | Stops CPU main internal clocks via hardware; bus interface and APIC kept running at full speed |
| C2E | Extended Stop Grant | Stops CPU internal and external clocks via hardware and reduces CPU voltage; bus interface and APIC kept running at full speed |
| C3 | Sleep/Deep Sleep/AltVID | Stops all CPU internal clocks, external clocks and/or reduces CPU voltage, depending on the processor involved |
| C4 | Deeper Sleep | Reduces CPU voltage |
| C4E/C5 | Enhanced Deeper Sleep | Reduces CPU voltage even more and turns off the memory cache |
| C6 | Deep Power Down | Reduces CPU internal voltage to any value, including 0 V |

As those skilled in the art will understand, the non-operating states in the Table above are merely exemplary of current processors and do not necessarily cover all possible non-operating states that can be implemented in a WPS algorithm of the present invention. In addition, it is noted that it can take a processor longer to return to an operating state for some non-operating states than others, and in some cases the recovery delay may need to be taken into consideration when designing a WPS algorithm in accordance with the present invention. That said, those skilled in the art will readily understand how to account for recovery delay in designing suitable WPS algorithms. As indicated in the Table, some non-operating states are controlled by software, while others are controlled by hardware. With proper implementation, a WPS algorithm according to the present disclosure can be designed to implement a non-operating state regardless of its control path.

Figure 1:
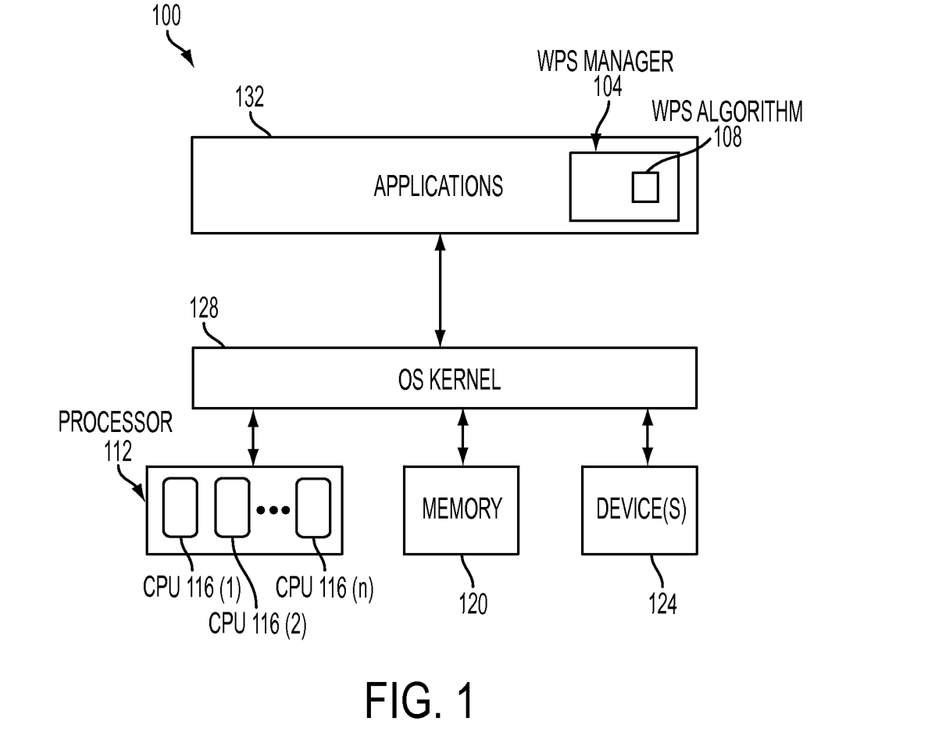
FIG. 1 is a high-level block diagram of an exemplary computing system that implements a workload power state (WPS) managing scheme of the present invention.

Referring now to FIG. 1, this figure illustrates an exemplary computing system 100 that includes a WPS manager 104 that implements a WPS algorithm 108 in accordance with the present disclosure. WPS algorithm 108 is described below in more detail after first describing other parts of computing system 100 to provide the reader with context. In this embodiment, the hardware side of computing system 100 includes a processor 112 (which has one or more CPUs 116(1) to 116(n)), memory 120, and one or more devices 124. As described below, processor 112 has at least one ultra-low-power non-operating state. As those skilled in the art will readily appreciate, each CPU 116(1) to 116(n) can be any CPU having the power states needed to implement a WPS algorithm of the present disclosure. Contemporary examples of such CPUs include processors of the Xeon® family of processors available from Intel Corporation, Santa Clara, Calif. Of course, many other processors currently available and likely to be available in the future from Intel, Advanced Micro Devices, Inc., and other processor manufactures have/will have power states suitable for implementing a WPS algorithm of the present invention, such as algorithm 108.

As those skilled in the art will readily understand, memory 120 includes RAM and any other memory computing system 100 utilizes to: store and execute software instructions; store input and output data; and store any other information needed for the proper functioning of the computing system. Devices 124 include input/output (I/O) devices, input devices, and/or output devices needed for making computing system 100 a properly functioning computing system. Examples of such devices include keyboards, mice, modems, network cards, displays, trackballs, touch pads, external memory drives, WiFi transceivers, etc.

On the software side, computing system 100 includes an operating system (OS) kernel 128 and one or more software applications 132. As those skilled in the art know, OS kernel 128 essentially forms a bridge between application(s) 132 and the software instruction execution, data handling and I/O processes performed by processor 112, memory 120, and devices 124. In the context of this example, the term "software application" is used broadly to include any set of software instructions that utilizes OS kernel 128 to perform a particular higher-than-kernel-level function or set of such functions. Under this definition, parts of the operating system other than OS kernel 128 can be considered software applications. Consequently, WPS manager 104 and corresponding WPS algorithm 108 are considered software applications and can be part of the OS, if desired.

Figure 2:
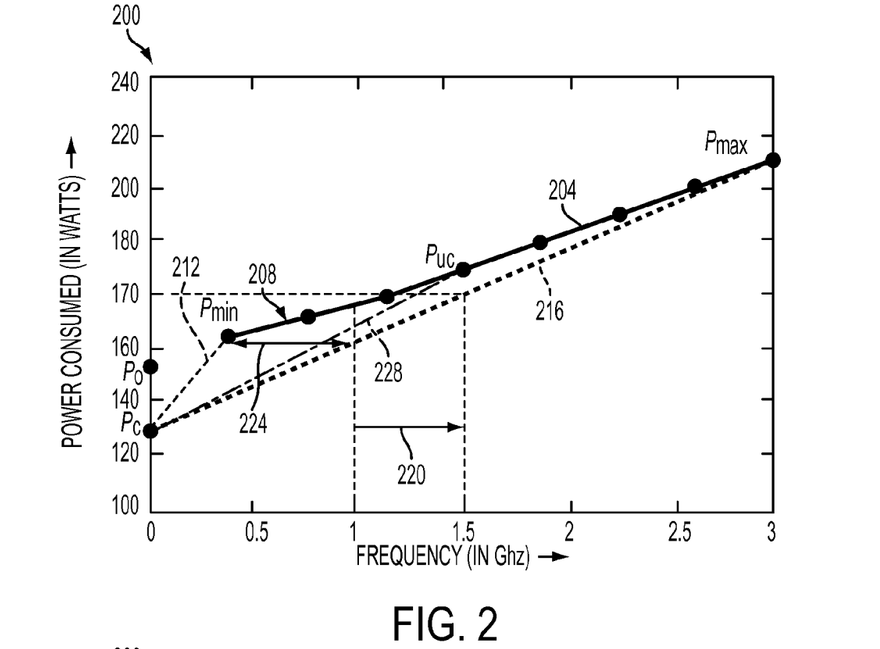
FIG. 2 is an exemplary graph of power consumed versus frequency for a 100% processor-bound double-precision A times X plus Y (DAXPY) workload for the processor of FIG. 1.

In this example, the non-operating state of processor 112 is the C1E state of the Table above, and the power consumption of processor 112 is illustrated by graph 200 of FIG. 2. Referring now to FIG. 2, and occasionally to FIG. 1, the solid line in FIG. 2, i.e., clock-throttling line 204, shows the power consumed by processor 112 as a function of the processor's frequency established by clock-throttling when the processor is 100% utilized by a CPU-bound workload, here a double-precision A-times-X plus-Y (DAXPY) workload. Clock-throttling line 204 is referred to as "the power-to-frequency relationship at 100% CPU utilization." It can be seen in graph 200 that, within the allowed frequency range of 0.375 GHz (point labeled $P_{min}$ in the graph) to 3 GHz (point labeled $P_{max}$ in the graph), the power-to-frequency relationship (line 204) is very close to linear. However, the power consumption in the C1E state, labeled point $P_C$ in FIG. 2, is 126 watts, which is 23 watts lower than the power value that the linear relationship would suggest, namely, point $P_0$=149 watts. (Point $P_0$ represents the zero-frequency extrapolated power consumption of a processor, here processor 112.) Because of this non-linear drop in power below 0.375 GHz ($P_{min}$), the power-to-frequency curve 208, which is a combination of clock-throttling line 204 and line 212, is actually concave downwards. This is an important attribute of ultra-low-power non-operating states that WPS algorithms of the present invention exploit.

As an example of how WPS manager 104 exploits the ultra-low-power C1E state, suppose that the power budget for processor 112 is about 170 watts. According to clock-throttling line 204 of graph 200, this power budget would allow processor 112 to be run at a steady frequency of 1 GHz. In the present invention, WPS algorithm 108 of WPS manager 104 alternates processor 120 between the maximum-power operating state point $P_{max}$ and low-power non-operating C1E state, point $P_C$, to achieve the same roughly 170-watt power budget. In one example, WPS algorithm 108 accomplishes this by alternating each second between approximately 220 watts (operating state point $P_{max}$) and 123 watts (non-operating state point $P_C$), to achieve an average power usage of about 170 watts. When running at 220 watts, frequency of processor 112 is (about) 3 GHz. When running at 123 watts, the frequency of processor is (about) 0 GHz. Hence, the average frequency of processor 112 achieved by alternating between 220 watts and 123 watts is (about) 1.5 GHz. This fact is expressed by dashed curve 216 connecting points $P_C$ and $P_{max}$. In this example, the average frequency of processor 112 has been increased from 1 GHz to 1.5 GHz (see line 220) without using any additional power. Observe that dashed curve 216 is always below concave-downward power-to-frequency curve 208. Graphically, the horizontal gap 224 between curves 208, 216 shows that for any desired power budget, P, the effective frequency achieved by WPS algorithm 108 of WPS manager 104 exceeds the effective frequency of clock-throttling.

While much of the present disclosure focuses on the clock-throttling mechanism for scaling between frequency and power, as mentioned above, the present invention is equally applicable to processors where other mechanisms are used for scaling between frequency and power, for example, DVFS, provided that the power consumption at point $P_0$ is greater than the power consumption at point $P_C$, which is needed for the downwards concave shape of the power-to-frequency relationship.

In the preceding example, WPS algorithm 108 of WPS manager 104 maintained a fixed power budget of about P=170 watts by alternating between 123 watts and 220 watts and spending r=½ fraction of time in an operating state, here the highest performance state. More generally, WPS algorithm 108 of WPS manager 104 can maintain any fixed power budget, P, by spending some (general) fraction r of time in an operating state, for example, the highest performance state as in the example above, and (1−r) fraction of time in a suitable non-operating state, here the C1E state. For example, suppose the requirement is that processor 112 maintain a power cap of 157 watts while running the 100% CPU-bound DAXPY workload represented in FIG. 2. If computing system 100 simply implemented a conventional power capping scheme that utilizes only operating processor states, processor 112 would run at a fixed 0.375 GHz at point $P_{min}$. Drawing a horizontal line (line 224) from point $P_{min}$ across to the dashed curve 216, it is seen that implementing a WPS management algorithm of the present invention, WPS manager 104 could achieve the same power consumption of 157 watts, but increase the effective frequency to over 1 GHz, nearly tripling the speed of processor 112. To achieve this effective frequency, WPS algorithm 108 could alternate, for example, between the C1E state (point $P_C$) and the 3 GHz state (point $P_{max}$), spending about r=⅓ of the time in the 3 GHz operating state and (1−r)=⅔ of the time in the C1E non-operating state. As is evident from graph 200 of FIG. 2, the improvement in effective frequency diminishes as the power cap increases, but it is always non-negative.

It is noted that the operating state does not necessarily have to be the maximum performance state (point $P_{max}$ in FIG. 2). In another example, the operating state could be an under-clocked state, such as under-clocked state represented by point $P_{UC}$ in FIG. 2, where the frequency is about 1.5 GHz and the power consumed is about 180 watts. Curve 228 connecting points $P_C$ and $P_{UC}$ represents this scenario. In this case, the effective frequency is about 0.8 GHz and the fraction of time r spent in the operating state represented by point $P_{UC}$ is about ½ and the fraction of time (1−r) spent at the C1E state is about ½. It should be apparent that other operating states and other non-operating states can be used if available.

In alternating between operating and non-operating states, the alternation period is defined herein to be the time between successive visits to the same state. In the example immediately above, if the alternation period is, say, 1 second, then WPS algorithm 108 would control processor 112 to repeatedly spend ½ second in the 1.5 GHz operating state followed by ½ second in the C1E non-operating state. Similarly, in the r=⅓ example above, for a 1 second alternation period, WPS algorithm 108 would control processor 112 to repeatedly spend ⅓ second in the 3 GHz operating state and ⅔ second in the C1E non-operating state. As described below, the exact duration of the alternation period has little effect on the improvement in mean response time afforded by WPS algorithms of the present invention.

To a degree that will depend on the specifics of a workload and the extent to which the workload is CPU-bound, the higher effective frequency will typically translate into lower response time. For example, in the first numerical example noted above, if the workload is 100% CPU-bound, it would be expected that the improvement in mean response time afforded by WPS algorithm 108 over clock-throttling would be almost a factor of three at lower power-cap values. In fact, this is what is seen for the DAXPY workload in that example.

Having introduced basic principles underlying the present invention, further details are provided below. These details can aid in understanding how to exploit these principles and to produce estimates of the improvement over standard power-capping approaches that run a processor at a chosen fixed frequency or dither between adjacent frequency states.

Figure 3:
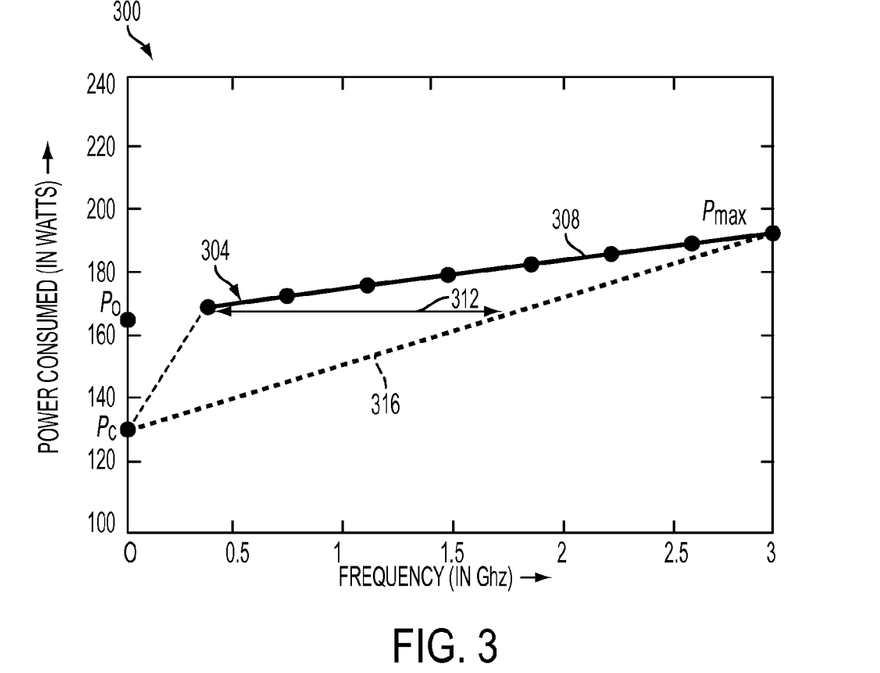
FIG. 3 is an exemplary graph of power consumed versus frequency for a memory-bound STREAM benchmarking workload for the processor of FIG. 1.

FIG. 3 is a graph 300 illustrating a power-to-frequency curve 304 for processor 112 of FIG. 1 for a memory-bound workload, here the STREAM benchmarking workload. As in graph 200 of FIG. 2, power-to-frequency curve 304 represents clock-throttling whereas the dashed curve 308 corresponds to algorithm 108. The clock-throttling portions 204, 308 of each of power-to-frequency curves 208, 304 of FIGS. 2 and 3, respectively, have an almost linear form. However, clock-throttling portion 308 in FIG. 3 has shallower slope than the clock-throttling line 204 in FIG. 2. This increases the downward concavity of power-to-frequency curve 304 for the memory-bound STREAM workload and in turn makes the horizontal gap 312 between clock-throttling portion 308 and WPS algorithm curve 316 much larger for the memory-bound STREAM workload than for the CPU-bound DAXPY workload. This lower slope can be explained as follows: since the STREAM benchmark is a memory-bound workload, it spends a lesser fraction of time using processor 112 than the CPU-bound DAXPY workload. In fact, the STREAM benchmark is around 70% memory-bound and 30% CPU-bound. Hence, on increasing the frequency of processor 112, the power consumed by the processor for the STREAM workload does not rise as quickly as for the DAXPY workload.

Given the higher downward concavity of power-to-frequency curve 304 for the STREAM workload as compared to power-to-frequency curve 208 (FIG. 2) for the DAXPY workload, one could expect to see a higher improvement in response time for the STREAM workload over the DAXPY workload. Specifically, horizontal gap 312 (FIG. 3) for the STREAM workload is greater than horizontal gap 224 (FIG. 2) for the DAXPY workload, and, hence, the improvement in effective frequency is also greater for the STREAM workload than for the DAXPY workload. However, the improvement in mean response time for a memory-bound workload does not scale in the same way as does the improvement in effective processor frequency. This is because the response time of a memory-bound workload is made up of time spent at processor 112 as well as time spent executing memory operations. On increasing the effective frequency of processor 112, only the time spent at the processor decreases, hence the overall improvement in mean response time is not as great as the improvement in effective processor frequency. This is addressed in more detail below in the Experimental Analysis section.

Figure 4:
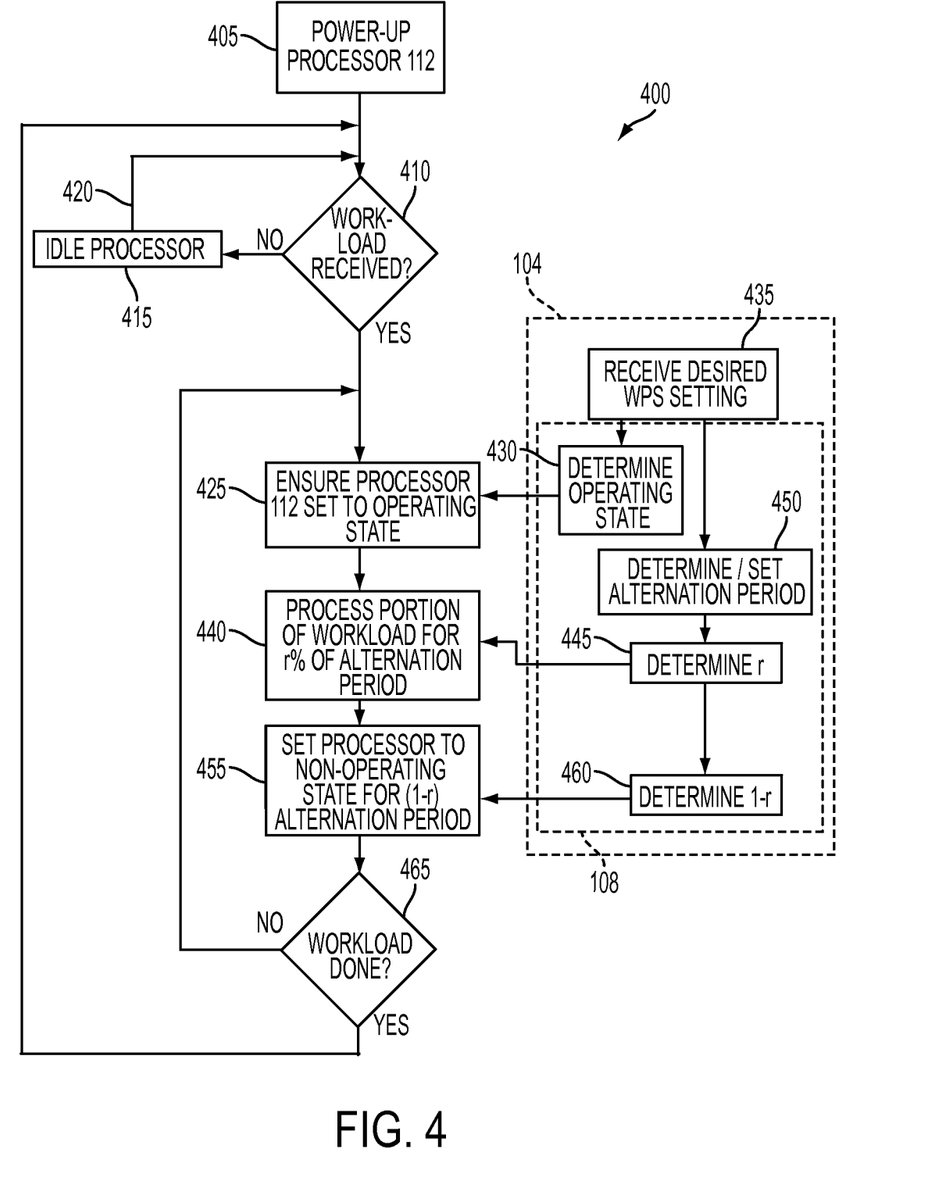
FIG. 4 is a diagram illustrating an exemplary processor control method implementing a WPS managing scheme in accordance with the present invention.

Referring now to FIG. 4, and also to FIG. 1, FIG. 4 illustrates an exemplary processor-control method 400 that can be used to implement a WPS algorithm of the present invention to control a processor, such as processor 112 of FIG. 1. It is noted that while method 400 is described in the context of processor 112 and computing system 100 of FIG. 1, method 400 is not limited to those particular instantiations of a processor and a computing system.

In this example, method 400 begins at step 405 with processor 112 being powered up. At step 410, it is determined whether or not a workload to be processed by processor 112 has been received. If no workload is present, processor 112 is idled at step 415, for example, by entering into an ultra-low-power state, such as any of the non-C0 states listed in the Table above. Once processor 112 has been idled, method 400 essentially enters a loop 420 wherein the processor is idle until a workload has been received. If at step 410 it is determined that a workload has been received, method 400 proceeds to step 425 wherein it is ensured that processor 112 is set to the desired operating state. As mentioned above, the desired operating state will typically, but not necessarily, be the maximum normal operating frequency state of processor 112. The operating state at step 425 can be determined by WPS algorithm 108 of WPS manager 104 (both reproduced for convenience in FIG. 4) at step 430 after the WPS manager receives a desired WPS setting, such as a power-cap or minimum-frequency value, at step 435. As described below in connection with FIG. 5, the desired WPS setting received at step 435 can be a power-cap value or a minimum-frequency value that can be received from, among other things, a user interface, an application that provides the workload or an input from an external source. The operating state of processor 112 implemented at step 425 can be preset, for example, at the maximum normal operating frequency state of the processor such that no determination need be made at step 430.

After processor 112 is ensured to be set to the desired operating state at step 425, at step 440 the processor processes a portion of the workload for a fraction r of an alternation period. The fraction r and the alternation period can be determined by WPS algorithm 108, respectively, at steps 445, 450. It is noted that the alternation period can simply be a preset value that is either a predetermined fixed value or is a value set, for example, by a user or an application that generates the workload. When WPS algorithm 108 is a power-capping algorithm used to achieve a power cap $P_{cap}$ and the algorithm uses the maximum normal operating frequency state at step 450, the fraction r can be found as follows:

$$r = \frac{f_{WPS}}{f_{MAX}} = \frac{P_{cap} - P_c}{P_{MAX} - P_c} \qquad \text{Eq. \{1\}}$$

Wherein:
 $f_{WPS}$ is the average frequency of processor 112 when controlled by WPS algorithm 108;
 $f_{max}$ is the frequency of the processor in the maximum normal operating frequency state;
 $P_C$ is the power consumption in the non-operating state; and
 $P_{max}$ is the power consumption of the processor in the maximum normal operating frequency state.

After processor 112 has processed a portion of the workload at step 440 for a period of r times the alternation period, at step 455 the processor is set to the specified non-operating state for a fraction (1−r) of the alternation period. This fraction (1−r) is determined by WPS algorithm 108 at step 460, for example, by simply subtracting the value of r determined in step 445 from 1. After processor 112 has been in the specified non-operating state for a period of (1−r) times the alternation period, if it is determined at step 465 that the processor has not fully processed the workload, method 400 loops back to step 425, and steps 425, 440, 455 and 465 are repeated so that the processor alternates between the operating state and the non-operating state until the processor has fully executed the workload. When it is determined at step 465 that processor 112 has executed the entire workload, method 400 loops back to step 410 to determine whether or not another workload is present for processing. Those skilled in the art will readily understand that method 400 is a very simplistic example to illustrate how a WPS algorithm of the present invention can be implemented in a computing system. Consequently, those skilled in the art will recognize that many other methods that exploit the basic principles of the present invention can be devised and implemented.

A benefit of implementing a WPS technique of the present invention is that the processor frequency at which the WPS technique operates a processor to achieve a given mean response time target can be easily predicted. This is in contrast to existing power-capping techniques, such as clock-throttling. To illustrate, $T_H$ is defined as the natural duration of a workload of any type when a processor operates at a frequency $f_{max}$. Under clock throttling, the processor slows to a frequency $f<f_{max}$, while the memory continues to operate at normal speed. If the workload is completely CPU-bound, under a closed-loop setting the workload completion time can be expected to increase to $T_H \times f_{max}/f$; otherwise, it can only be said that it should exceed the duration $T_H$.

Under a WPS algorithm of the present invention, however, the processor and memory are treated equally: they are both either fully utilized or fully unutilized. Thus, both are slowed by the same factor r. According to Equation {1}, the expected workload completion time, $E[T_{WPS}]$, for a workload of any type is expected to increase to:

$$E[T_{WPS}] = T_H \times f_{max}/f_{WPS} \qquad \text{Eq. \{2\}}$$

wherein $T_H$ is obtained via measurements.

The mean response time under existing power-capping techniques is not entirely predictable and is very application specific. Thus, a user cannot predict the power cap or processor frequency that the processor must be operated at to achieve a given performance target, say, mean response time target. By using a WPS algorithm of the present invention, however, the processor frequency value, $f_{WPS}$ (using Equation {2}), required to meet the given mean response time target can be predicted. Thus, the value of $r=f_{WPS}/f_{max}$ can be set to give the fraction of time that the WPS algorithm should spend in the highest operating state.

Figure 5:
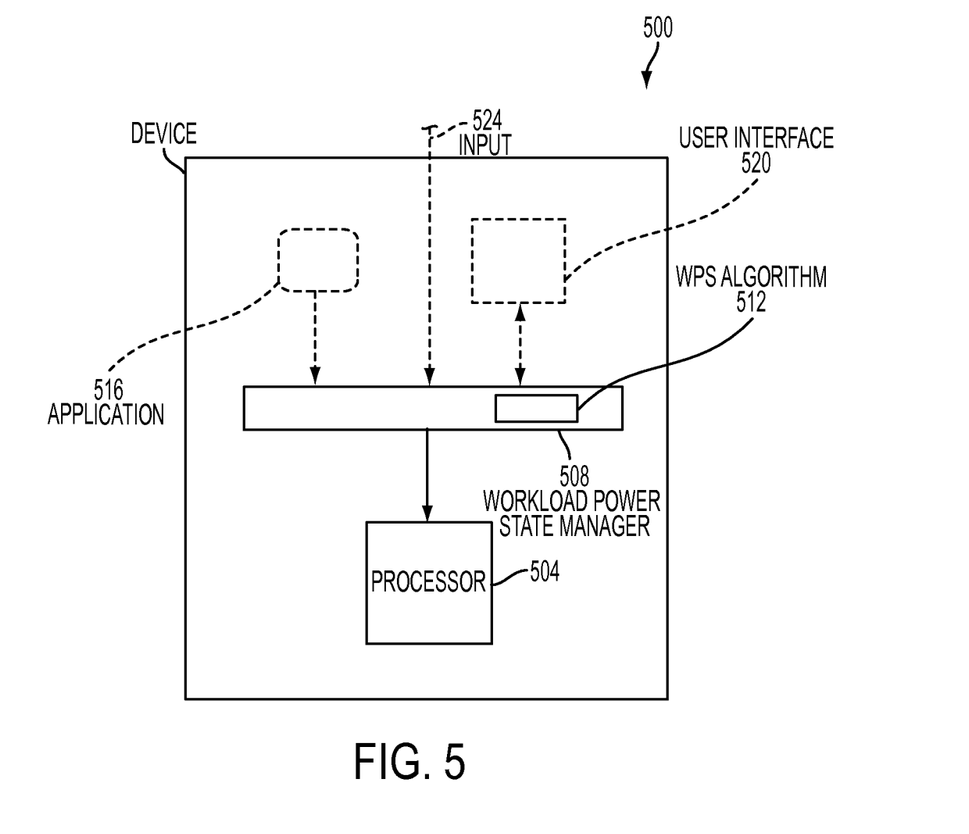
FIG. 5 is a high-level diagram of a device that implements a WPS managing scheme of the present invention.

FIG. 5 illustrates a device 500 containing a processor 504 and that implements a WPS manager 508 that controls the power state of the processor in a manner that repeatedly alternates the processor between an operating state and a non-operating state while the processor is processing a workload. WPS manager 508 implements a WPS algorithm 512, which is the same as or similar to WPS algorithm 108 described above in connection with FIGS. 1-4. Device 500 can be any device that includes a computing system, such as computing system 100 of FIG. 1. Device 500 can be, for example, a traditionally non-mobile device, such as a desktop computer, mainframe computer or server, or can be, for example, a mobile device, such as a laptop computer, smartphone, tablet computer, or netbook, among others. Consequently, processor 504 can be a traditionally non-mobile processor or can be a mobile processor (which is typically a lower-power processor than a non-mobile processor), depending on what device 500 is.

The nature of device 500 may drive other features of the device. For example, if device 500 is a mobile device, such as a laptop or tablet computer, it may be desirable to control the power consumption of processor 504 by implementing a frequency-control-based WPS algorithm. For example, when device 500 runs a video-playback application 516 that requires that processor 504 operate at a certain minimum frequency for proper playback of a video, that application could specify that minimum frequency to WPS manager 508, which would then use that information to control the processor to repeatedly alternate between the selected operating and non-operating states to achieve that frequency as a mean frequency. In accordance with the description accompanying FIG. 4 above, this mean frequency can be achieved over a particular alternation period by operating processor 504 in the operating state for a fraction r of the alternation period, wherein $r=f_{min\ req'd}/f_{oper}$. As another example, such a mobile device could be provided with a user-interface 520, such as a hard or a soft control (e.g., slider, dial, etc.), that allows a user to select an appropriate mean frequency for the application being used.

In another example, device 500 is a server that is part of a large server farm (not shown). In this example, WPS manager 508 could implement a power-capping algorithm that caps the average power consumption over an alternation period to a particular power-cap value. In one embodiment, the power-cap value is set using a user interface 520 provided by device 500. In another embodiment, such as may be used in a server farm containing many instantiations of device 500, the power-cap is set via an input 524 from another source (not shown) of the value. For example, in the server-farm context, the server-farm may include a server-farm power manager (not shown) that essentially oversees the power consumption of the entire server farm and dynamically controls device 500 and like devices via a WPS algorithm in a manner that accounts for workloads and power consumption across all of the devices. Those skilled in the art will understand that these are just a few examples of the many ways a device made in accordance with the present invention can be configured and implemented.

Experimental Analysis

The efficacy of WPS algorithms of the present invention was demonstrated in a number of experiments with both CPU-bound workloads and memory-bound workloads. The experimental setup consisted of a BladeCenter® HS21 blade server, available from International Business Machines Corporation, Armonk, N.Y. (IBM), that featured two 3.0 GHz dual-core Intel Woodcrest processors and 4 GB of memory per blade. All of the experiments (including the ones resulting in FIGS. 2 and 3) were conducted on the Linux operating system, and power consumption was measured via IBM's AMEster software. These experiments utilized three workloads: the DAXPY workload and Intel's UNPACK benchmark workload for CPU-bound workloads and the STREAM benchmark workload for the memory-bound workload. The httperf workload generator was used to generate jobs that ran sequentially, one right after the other, so that there was always exactly one job in the system (closed-loop). Using httperf, the mean response time of the jobs was recorded, and the AMEster software was used to set the clock-throttling state and measure the server's mean power consumption.

To compare the WPS algorithms of the present invention to conventional clock-throttling, the workload was first run under clock-throttling by setting the processor to each of the available throttle states and measuring the power consumption at these states. Equation {1} was then used to compute the value of r that would result in the same time-averaged power consumption obtained by clock-throttling. Each WPS algorithm tested was implemented using a simple script that alternated the server between its highest normal operating state (point $P_{max}$ in FIG. 2), and the non-operating C1E halt state (point $P_C$ in FIG. 2). In the first run, the WPS algorithm alternated between the states with an alternation period of one second, i.e., r×(1 second) was spent in the 3-GHz operating state and (1−r)×(1 second) was spent in the non-operating state.

To study the effect of the alternation period on the improvement in mean response time afforded by WPS algorithms of the present invention over clock-throttling, an average power consumption value was fixed and algorithms having differing alternation periods were run. Following is a description of the results for the three workloads, i.e., the DAXPY, UNPACK, and STREAM workloads.

Figure 6A:
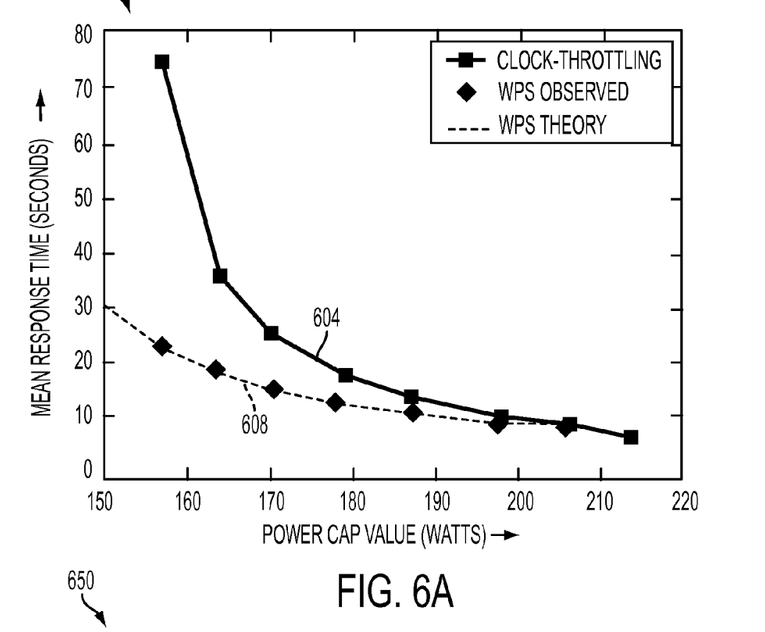
FIG. 6A is a graph illustrating the improvement in mean response time of a WPS algorithm of the present invention over clock throttling for a DAXPY CPU-bound workload.

FIG. 6A is a graph 600 illustrating the improvement in mean response time afforded by a WPS algorithm of the present invention over conventional clock-throttling for the 100% CPU-bound DAXPY workload. Observe that the ratio of clock-throttling's mean response time (curve 604) to the mean response time for the WPS algorithm (curve 608) ranges from 1.0 at a power cap of 210 watts to as much as 3.5 for a power cap of 160 watts. The tremendous improvement at low average power levels results from exploiting the power savings of the C1E state for a longer fraction of time. Theoretical predictions for the algorithm of the present invention are shown using the dashed line, which sits right on top of the experimental results.

Figure 6B:
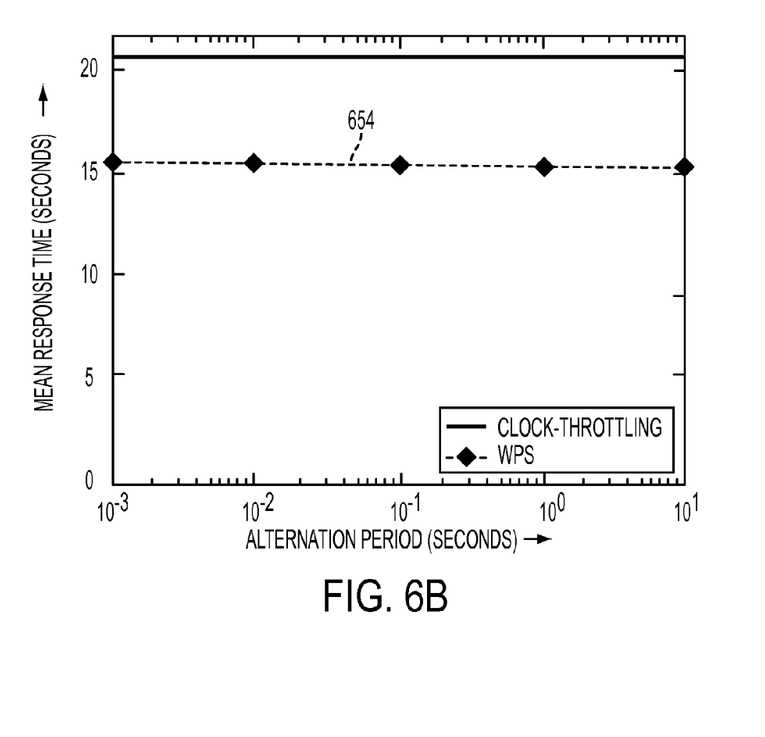
FIG. 6B is a graph illustrating the effect of the alternation period on the improvement in mean response time afforded by a WPS algorithm of the present invention over clock throttling for a DAXPY CPU-bound workload.

FIG. 6B is a graph 650 illustrating the effect of the alternation period on the improvement in mean response time afforded by the WPS algorithms of the present invention over conventional clock-throttling for a power budget of P=180 watts. It is seen from curve 654 that the alternation period has no significant effect on the improvement in mean response time afforded by the algorithms of the present invention. This result held true in experiments for other values of P as well.

Figure 7A:
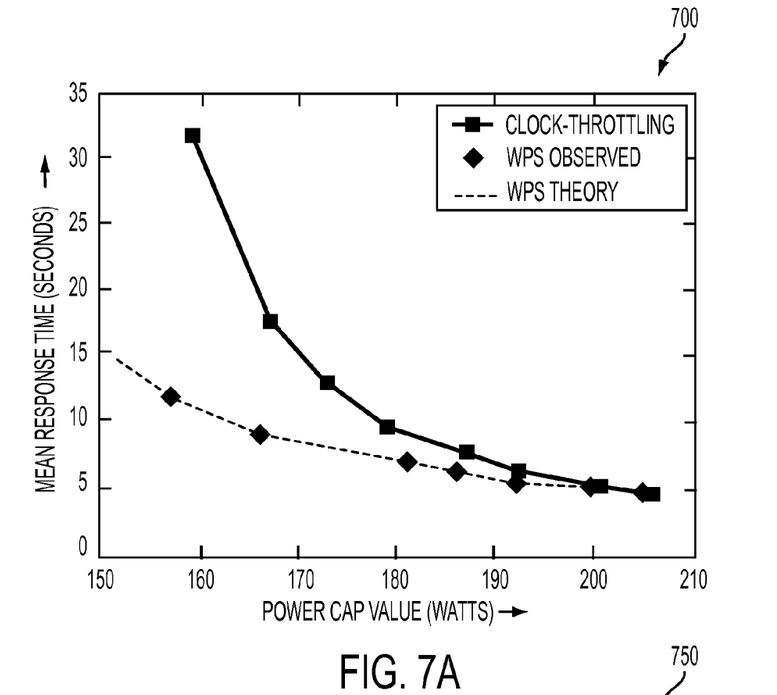
FIG. 7A is a graph illustrating the improvement in mean response time of a WPS algorithm of the present invention over clock throttling for a UNPACK CPU-bound workload.
Figure 7B:
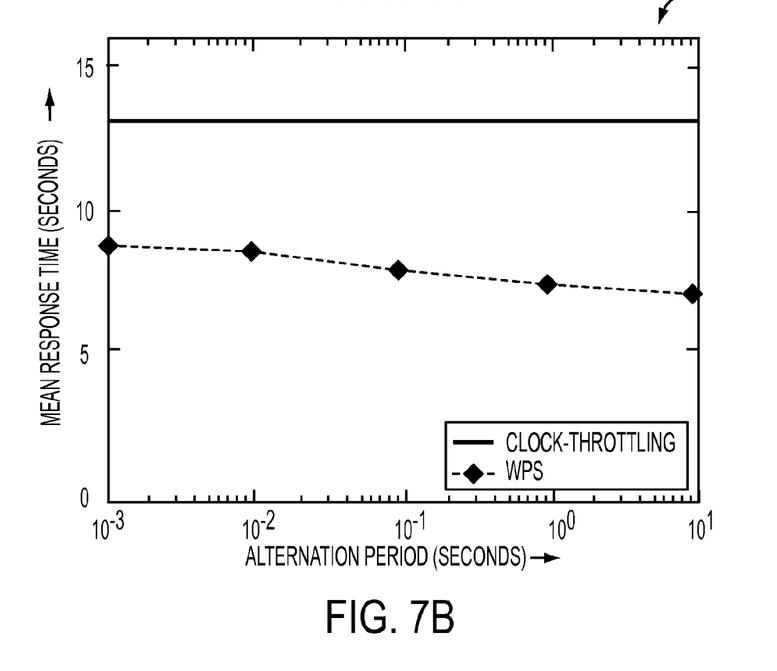
FIG. 7B is a graph illustrating the effect of the alternation period on the improvement in mean response time afforded by a WPS algorithm of the present invention over clock throttling for a UNPACK CPU-bound workload.
Figure 8A:
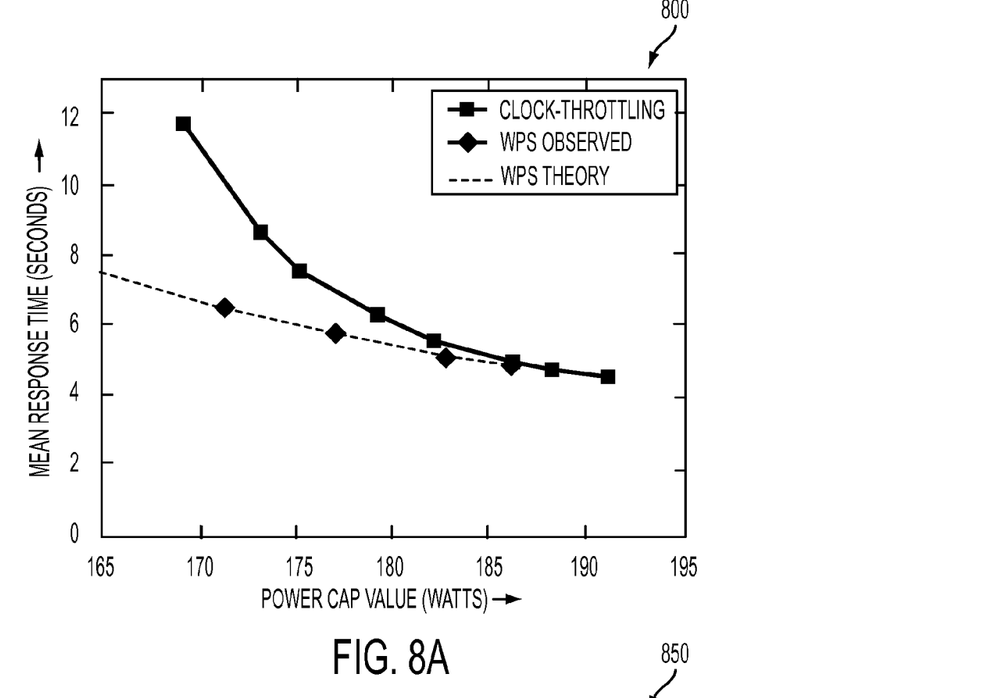
FIG. 8A is a graph illustrating the improvement in mean response time of a WPS algorithm of the present invention over clock throttling for a STREAM memory-bound workload.
Figure 8B:
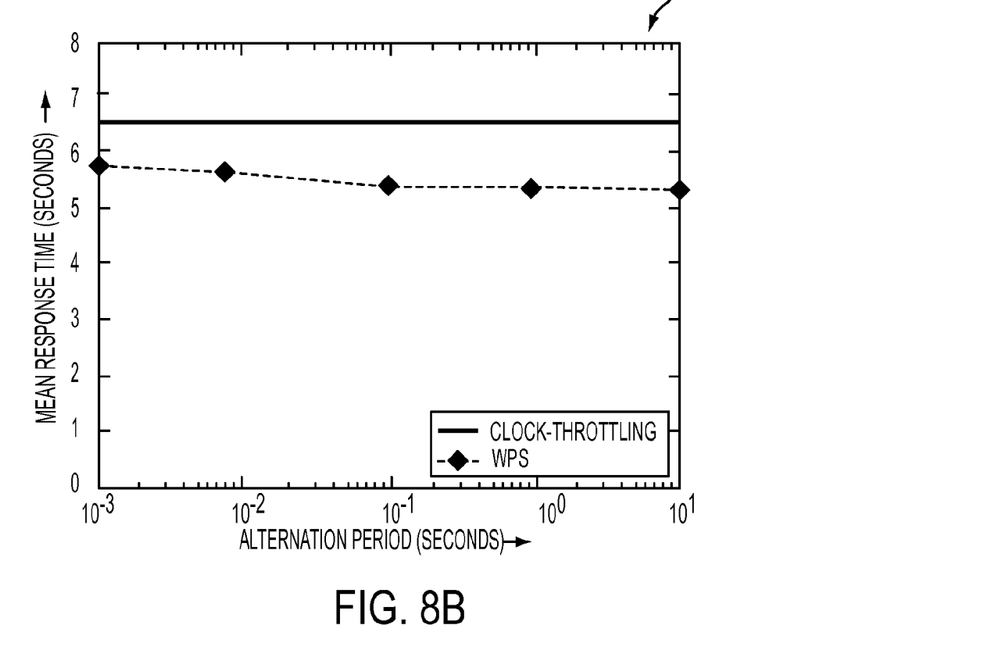
FIG. 8B is a graph illustrating the effect of the alternation period on the improvement in mean response time afforded by a WPS algorithm of the present invention over clock throttling for a STREAM memory-bound workload.

Graphs 700, 750, 800, 850 of FIGS. 7A-B and 8A-B present comparable results for the UNPACK workload (FIGS. 7A-B), which runs at about 70% CPU utilization (because the initialization phase runs on one core and the solving phase runs on all cores) and for the memory-bound STREAM workload (FIGS. 8A-B). The response time improvements for the UNPACK workload are reduced slightly below the response time improvements for the DAXPY workload, and the response time improvements for the STREAM workload are reduced even further, as mentioned above. Note the effect of alternation period on the improvement in mean response time afforded by the algorithms of the present invention over clock-throttling in FIGS. 7B and 8B. It is seen that the percentage improvement dropped slightly as the alternation period was shortened.

This drop in improvement can be explained as follows: when the alternation period is shortened, there will be more alternations per second between the 3 GHz operating state and the non-operating C1E state. For larger alternation periods, the overhead due to alternating between these states is negligible. However, at alternation periods as low as 0.001 seconds, there are a thousand alternations happening in the system every second. These alternations affect the performance of the workload significantly. However, even at an alternation period of 0.001 seconds, we see that the WPS algorithms of the present invention provide a 30% improvement in mean response time over clock-throttling for both the UNPACK and STREAM workloads. Thus, it appears that the WPS algorithms of the present invention can be implemented at granularities at least as fine as a millisecond. Since WPS algorithms of the present invention work even for alternation periods at least as small as 1 millisecond, they can respond well to spikes in power supply or workload variations by changing the effective server frequency to ensure that the desired power cap is maintained.

It is noted that the performance of the WPS algorithms of the present invention is entirely predictable across all workloads as described above. This is evidenced by the fact that the dashed lines (the theoretical predictions) in FIGS. 6A-B, 7A-B and 8A-B are always on top of the experimental values, which are shown as diamonds.

Figure 9:
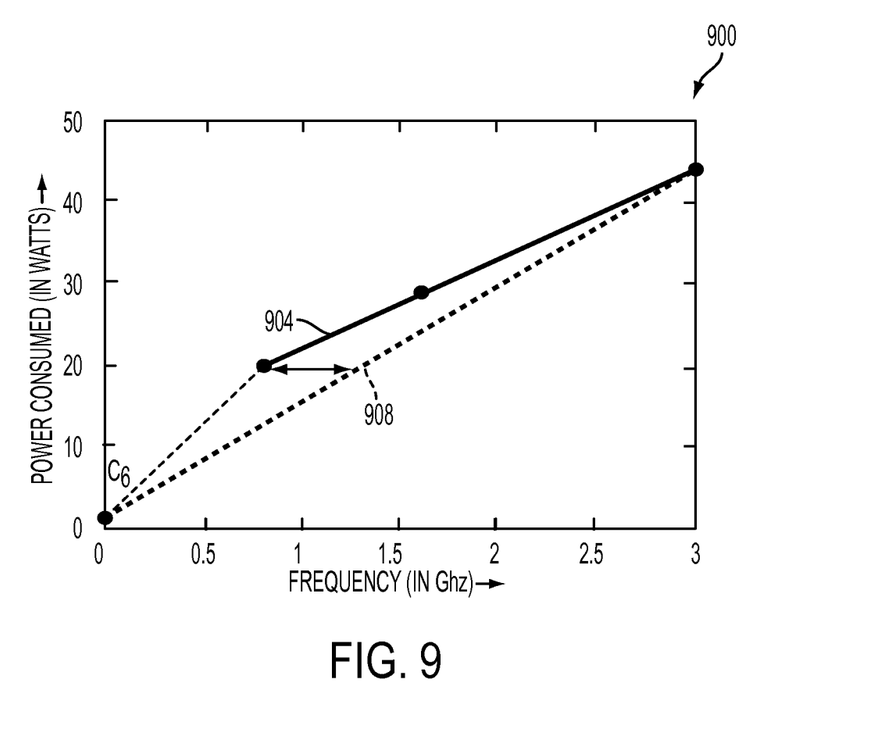
FIG. 9 is a graph illustrating use of a WPS algorithm of the present invention on a mobile processor implementing a dynamic voltage and frequency scaling power management scheme.

As mentioned above, the principles underlying the present invention are applicable to currently available processors that use clock-throttling and will also be applicable to processors that use DVFS when they are enabled with ultra-low-power non-operating states (such as the C3, C6 and other states mentioned in the Table above). The power consumption for these non-operating states is expected to fall below the extrapolated value (see, e.g., point $P_0$ in FIG. 2) obtained from the power-to-frequency relationship for DVFS, making the power-to-frequency relationship concave downward. FIG. 9 is a graph 900 showing a processor power-to-frequency curve 904 for current-generation Intel mobile processors (Dual Core Extreme x9100) that have these advanced idle states, assuming worst-case workload. Future servers are expected to have these same, or similar, non-operating states, resulting in the downwards concave behavior that could be exploited with algorithms of the present invention. In the future, there may be other mechanisms by which additional CPU frequencies may become available. The WPS algorithms of the present invention can then use any one of these available frequencies as the operating state, and alternate between that operating state and a non-operating state.

As shown in FIG. 9, WPS algorithms of the present invention (represented by curve 908) should again offer improvements over existing power capping throughout the entire range of power caps, with up to a factor of 1.6 improvement in effective frequency. While FIG. 9 suggests a linear power-to-frequency curve, a non-linear power-to-frequency curve can be envisioned, especially towards the high frequency end of the spectrum. In such cases, the improvement over DVFS afforded by WPS algorithms of the present invention could be limited to the lower frequency range.

It is noted that DVFS might not allow the WPS algorithms of the present invention to achieve the full range of frequencies obtainable under clock-throttling, namely frequencies below 0.75 GHz in the example of FIG. 9. Therefore, clock-throttling may be the only mechanism for frequency scaling in the less-than-0.75-GHz frequency regime. Even in computing systems that deploy DVFS in the higher frequency range, WPS algorithms of the present invention can still be used to improve upon clock-throttling in the lower frequency range; the only difference is that the WPS algorithms would be set to alternate between a non-operating state and the operating state that is the lowest DVFS state.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of controlling power consumption of a computing system that includes a processor having an operating state in which the processor is powered to execute workload instructions, a non-operating state in which the processor is not powered to execute the workload instructions, and an idle state in which no workload for the processor is present, the method comprising:
receiving a workload-power-state setting for controlling functioning of the processor; and
controlling the processor as a function of the workload-power-state setting, wherein said controlling includes alternating the processor between the operating state and the non-operating state while the processor is not in the idle state.

2. A method according to claim 1, wherein said alternating the processor between the operating state and the non-operating state includes operating the processor for a fraction r of an alternation period in the operating state and setting the processor into the non-operating state for a fraction (1−r) of the alternation period.

3. A method according to claim 2, wherein the processor has an operating frequency, $f_{oper}$, in the operating state and said receiving the workload-power-state setting includes receiving a desired frequency, $f_{WPS}$, the method further comprising calculating the fraction r from the equation:

$$r = f_{WPS}/f_{oper}.$$

4. A method according to claim 2, wherein the processor has a power consumption, $P_{oper}$, in the operating state, the processor has a power consumption $P_C$ during the non-operating state, and said receiving the workload-power-state setting includes receiving a desired power cap, $P_{WPS}$, the method further comprising calculating the fraction r from the equation:

$$r = (P_{WPS} - P_C)/(P_{oper} - P_C).$$

5. A method according to claim 1, wherein the processor has a minimum operating frequency and a corresponding minimum-operating power consumption and said alternating the processor between the operating state and the non-operating state includes alternating the processor between the operating state and a non-operating state having a power consumption lower than the minimum-operating power consumption.

6. A method according to claim 5, wherein the processor has a normal-maximum-operating-frequency state and a corresponding normal-maximum power consumption and said alternating the processor between the operating state and the non-operating state includes alternating the processor between the normal-maximum-operating-frequency state and a non-operating state having a power consumption lower than the minimum-operating power consumption.

7. A method according to claim 1, wherein the processor has a normal-maximum-operating-frequency state and a corresponding normal-maximum power consumption and said alternating the processor between the operating state and the non-operating state includes alternating the processor between the normal-maximum-operating-frequency state and the non-operating state.

8. A method according to claim 1, wherein said receiving the workload-power-state setting includes receiving the workload-power-state setting via a user interface.

9. A method according to claim 1, wherein said receiving the workload-power-setting includes receiving the workload-power-state setting from an application that generates the workload.

10. A method according to claim 1, wherein said receiving the workload-power-setting includes receiving the workload-power-state setting via an input to the computing system from a source external to the computing system.

11. A method according to claim 1, wherein the processor has a zero-frequency extrapolated power consumption, $P_0$, extrapolated from a power-consumption-to-frequency curve for the processor and said alternating the processor between the operating state and the non-operating state includes alternating the processor between the operating state and a non-operating state having a power consumption, $P_C$, that is lower than $P_0$.

12. A machine-readable medium containing non-transitory machine-executable instructions for performing a method of controlling power consumption of a computing system that includes a processor having an operating state in which the processor is powered to execute workload instructions, a non-operating state in which the processor is not powered to execute the workload instructions, and an idle state in which no workload for the processor is present, said non-transitory machine-executable instructions comprising:
   a first set of machine-executable instructions for receiving a workload-power-state setting for controlling functioning of the processor; and
   a second set of machine-executable instructions for controlling the processor as a function of the workload-power-state setting, wherein said second set of machine-executable instructions includes a third set of machine-executable instructions for alternating the processor between the operating state and the non-operating state while the processor is not in the idle state.

13. A machine-readable medium according to claim 12, wherein said third set of machine-executable instructions includes machine-executable instructions for operating the processor for a fraction r of an alternation period in the operating state and for setting the processor into the non-operating state for a fraction (1−r) of the alternation period.

14. A machine-readable medium according to claim 13, wherein the processor has an operating frequency, $f_{oper}$, in the operating state and said first set of machine-executable instructions includes machine-executable instructions for receiving a desired frequency, $f_{WPS}$, said non-transitory machine-executable instructions further comprising machine-executable instructions for calculating the fraction r from the equation: $r=f_{WPS}/f_{oper}$.

15. A machine-readable medium according to claim 13, wherein the processor has a power consumption, $P_{oper}$, in the operating state, the processor has a power consumption $P_C$ during the non-operating state, and said first set of machine-executable instructions includes machine-executable instructions for receiving a desired power cap, $P_{WPS}$, said non-transitory machine-executable instructions further comprising machine-executable instructions for calculating the fraction r from the equation: $r=(P_{WPS}-P_C)/(P_{oper}-P_C)$.

16. A machine-readable medium according to claim 12, wherein the processor has a minimum operating frequency and a corresponding minimum-operating power consumption and said third set of machine-executable instructions includes machine-executable instructions for alternating the processor between the operating state and a non-operating state having a power consumption lower than the minimum-operating power consumption.

17. A machine-readable medium according to claim 16, wherein the processor has a normal-maximum-operating-frequency state and a corresponding normal-maximum power consumption and said third set of machine-executable instructions includes machine-executable instructions for alternating the processor between the normal-maximum-operating-frequency state and a non-operating state having a power consumption lower than the minimum-operating power consumption.

18. A machine-readable medium according to claim 12, wherein the processor has a normal-maximum-operating-frequency state and a corresponding normal-maximum power consumption and said third set of machine-executable instructions includes machine-executable instructions for alternating the processor between the normal-maximum-operating-frequency state and the non-operating state.

19. A machine-readable medium according to claim 12, wherein said first set of machine-executable instructions includes machine-executable instructions for receiving the workload-power-state setting via a user interface.

20. A machine-readable medium according to claim 12, wherein said first set of machine-executable instructions includes machine-executable instructions for receiving the workload-power-state setting from an application that generates the workload.

21. A machine-readable medium according to claim 12, wherein said first set of machine-executable instructions includes machine-executable instructions for receiving the workload-power-state setting via an input to the computing system from a source external to the computing system.

22. A machine-readable medium according to claim 12, wherein the processor has a zero-frequency extrapolated power consumption, $P_0$, extrapolated from a power-consumption-to-frequency curve for the processor and said third set of machine-executable instructions includes machine-executable instructions for alternating the processor between the operating state and a non-operating state having a power consumption, $P_C$, that is lower than $P_0$.

23. A computing system, comprising:
   a processor having an operating state in which said processor is powerable to execute workload instructions, a non-operating state in which said processor is not powered to execute the workload instructions, and an idle state in which no workload for the processor is present;
   a memory; and
   a workload-power-state manager stored in said memory and operatively configured to, when the computing system is operating:
      receive a workload-power-state setting for controlling functioning of said processor; and
      control said processor as a function of the workload-power-state setting, wherein said control includes alternating said processor between the operating state and the non-operating state while said processor is not in the idle state.

24. A computing system according to claim 23, wherein said workload-power-state manager is configured to operate said processor for a fraction r of an alternation period in the operating state and set said processor into the non-operating state for a fraction (1−r) of the alternation period.

25. A computing system according to claim 24, wherein said processor has an operating frequency, $f_{oper}$, in the operating state and said workload-power-state manager is configured to receive a desired frequency, $f_{WPS}$, and to calculate the fraction r from the equation: $r=f_{WPS}/f_{oper}$.

26. A computing system according to claim 24, wherein said processor has a power consumption, $P_{oper}$, in the operating state, said processor has a power consumption $P_C$ during the non-operating state, and said workload-power-state manager is configured to receive a desired power cap, $P_{WPS}$, and to calculate the fraction r from the equation: $r=(P_{WPS}-P_C)/(P_{oper}-P_C)$.

27. A computing system according to claim 23, wherein said processor has a minimum operating frequency and a corresponding minimum-operating power consumption and said workload-power-state manager is configured to alternate said processor between the operating state and a non-operating state having a power consumption lower than the minimum-operating power consumption.

28. A computing system according to claim 27, wherein the at least one processor has a normal-maximum-operating-frequency state and a corresponding normal-maximum power consumption and said workload-power-state manager is configured to alternate said processor between the normal-maximum-operating-frequency state and a non-operating state having a power consumption lower than the minimum-operating power consumption.

29. A computing system according to claim 23, wherein the processor has a normal-maximum-operating-frequency state and a corresponding normal-maximum power consumption and said workload-power-state manager is configured to alternate said processor between the normal-maximum-operating-frequency state and the non-operating state.

30. A computing system according to claim 23, further comprising a user interface, wherein said workload-power-state manager is configured to receive the workload-power-state setting via said user interface.

31. A computing system according to claim 23, wherein the computing system is configured to execute a workload generated by an application, wherein said workload-power-state manager is configured to receive the workload-power-state setting from the application.

32. A computing system according to claim 23, further comprising an input from a source external to the computing system, wherein said workload-power-state manager is configured to receive the workload-power-state setting via said input.

33. A computing system according to claim 23, wherein said processor has a zero-frequency extrapolated power consumption, $P_0$, extrapolated from a power-consumption-to-frequency curve for the processor and said workload-power-state manager is configured to alternate said processor between the operating state and a non-operating state having a power consumption, $P_C$, that is lower than $P_0$.

* * * * *